March 14, 1944.
J. L. FINCH
2,344,238
COMPRESSED FLUID CONDENSER
Filed Jan. 19, 1939
2 Sheets-Sheet 1
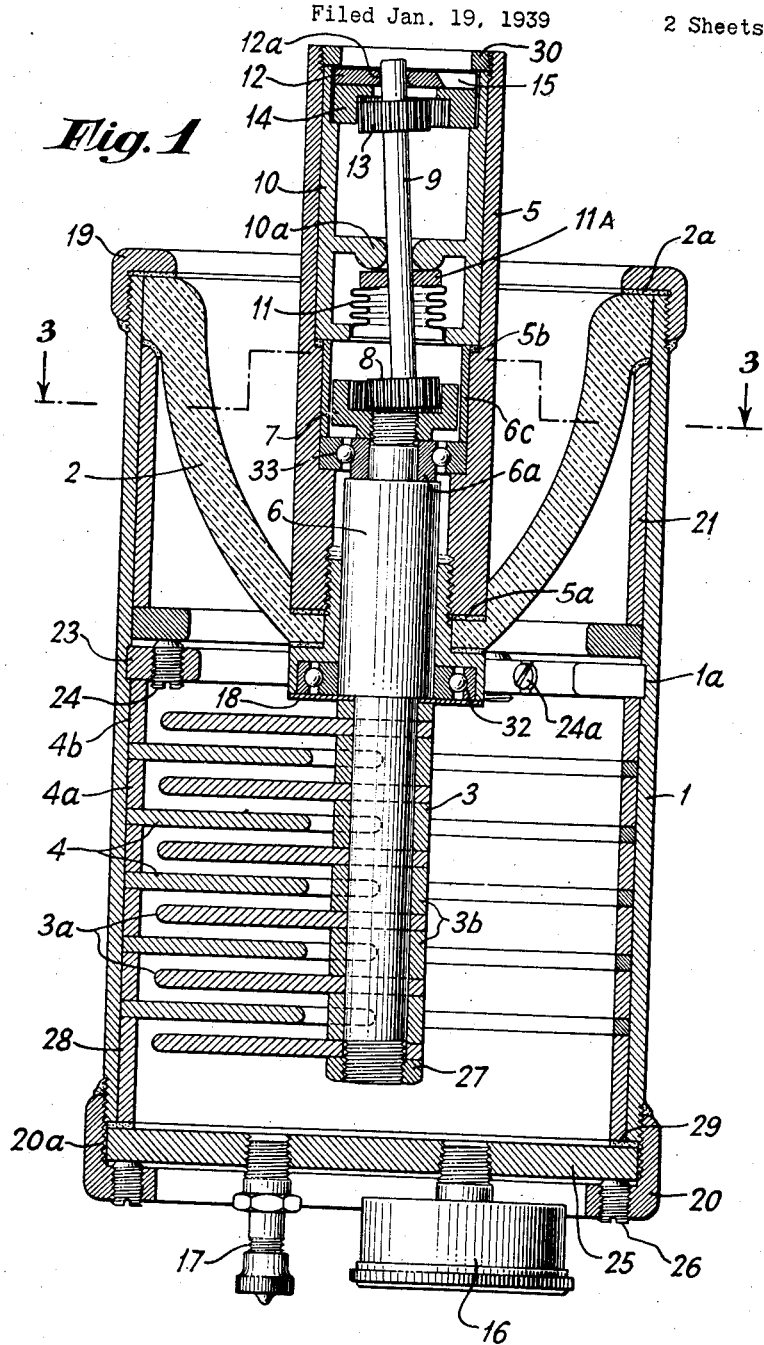
INVENTOR.
J. L. FINCH
BY H. S. Grover
ATTORNEY.

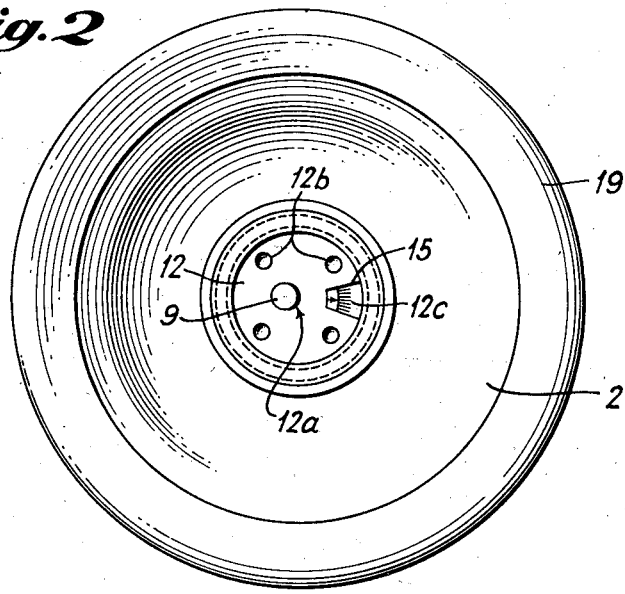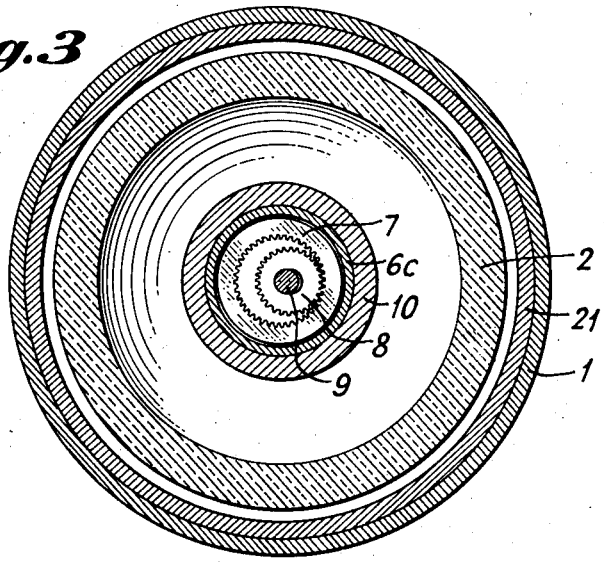

Patented Mar. 14, 1944

2,344,238

UNITED STATES PATENT OFFICE 2,344,238

COMPRESSED FLUID CONDENSER

James L. Finch, Patchogue, N. Y., assignor to Radio Corporation of America, a corporation of Delaware Application January 19, 1939, Serial No. 251,757

12 Claims. (Cl. 175—41.5)

This invention relates to a new and novel compressed fluid condenser which is particularly adapted for use in a tuned anode circuit of high frequency power amplifiers of a radio transmitter.

An object of this invention is to provide a condenser which has means for adjusting the capacity and at the same time to prevent the leakage of the fluid.

Another object of this invention is to provide adjustable means in which the movable electrodes are rotated by employing a novel gearing arrangement.

A feature of my invention makes use of the fundamental principles of transmitting mechanical motion by means of a gearing arrangement, through a flexible diaphragm or bellows, the diaphragm or bellows serving as a seal against fluid leakage.

Although condensers of the compressed fluid type are old in the art, they are frequently subject to defects in that the adjustment obtainable has been very small. In other cases, the fluid was not perfectly sealed from leakage at the point where the mechanical motion was transmitted into the gas filled chamber.

This invention will best be understood by referring to the accompanying drawings, in which:

Fig. 1 is a sectional view of the condenser of this invention;

Fig. 2 is a plan view of Fig. 1; and

Fig. 3 is a cross-section of Fig. 1, taken on lines 3—3.

Referring now in detail to the drawings, which shows a preferred form of this invention, a casing or shell 1, made of any suitable metal of high electrical conductivity and suitable for withstanding high internal pressure, is provided to enclose the fixed and variable electrodes. In the upper portion of casing 1 there is located an insulator 2, which is sealed against fluid leakage by means of a gasket 2a. Insulator 2 supports and insulates a rotor 3 comprising a plurality of plates 3a, preferably of a semi-circular pattern, and spacers 3b. A plurality of fixed plates 4, also semi-circular in form, are interposed between movable plates 3a and are spaced by means of members 4a and 4b. A metallic connection and auxiliary casing member 5 is secured rigidly to insulator 2 and is sealed from fluid leakage by gasket 5a. Member 5, by means of two sets of ball bearings 32 and 33, supports the rotor plate assembly 3 by means of a shaft 6 on which is mounted an internal gear 7. A second gear 8 is positioned inside of gear 7 and held eccentric with the internal gear which is free to move within the limits of this eccentricity but not to rotate. Gear 8 is provided with a fewer number of teeth than the internal gear 7. A shaft member 9 supports gear 8 and is in itself held central at its middle portion by a bearing 10a of housing 10. Shaft 9 is arranged within housing 10 so that it is free to take positions other than coaxial. A flexible bellows 11, which may also be in the form of a thin diaphragm, is arranged on the lower edge of housing 10 and sealed against gas leakage to casing 5 by gasket 5b. The upper edge is sealed against gas leakage by having washer 11A soldered to bellows 11 and to member 9. This latter arrangement prevents the fluid or gas from leaving casing 1 through auxiliary housing 5. A disc 12 is held securely to the extreme upper end of member 5, except that it is free to rotate. Shaft 9 passes through an aperture 12a in member 12, which aperture is arranged somewhat eccentric and at an angle to provide proper mesh of the teeth or gear 8 with internal gear 7. Apertures 12b are provided into which a tool (not shown) may be fitted and by means of which disc 12 may be rotated. As member 12 is turned, shaft 9 rocks around bearing 10a, causing diaphragm or bellows 11 to flex and to revolve gear 8 within a gear 7. If, for example, gear 8 has one less tooth than gear 7, then for each revolution of member 12, gear 7 and consequently rotary plates 3a will rotate by an amount corresponding to the angular spacing of the teeth in gear 7. To provide an index of the rotary plate, the upper end of shaft 9 is secured a third gear 13 which meshes with a fourth gear 14 of the internal type and is arranged in the same general manner as gears 7 and 8. Thus, as disc 12 is rotated, internal gear 14 turns an equal amount as the rotation of gear 7 and plates 3a. On the face of gear 14 is engraved numerals and/or a scale 12c, which can be viewed through an aperture 15 and which also serves to indicate the position of plates 3a and thus indirectly gives the setting for the capacity of the condenser.

Although the drawing shows the rotor and stator plates as consisting of half discs, if a balanced type of rotor is desired, plates 3a may be in the form of two 90° quadrants, spaced opposite each other. In the assembling of the plates, both sets are built up from the bottom, using washers or rings. The stator plates are preferably cut from complete discs and an aperture substantially complementary to the outline of the rotor plates cut out therefrom, the outer edge of which is left complete to form a ring-like structure and serves to complete the stack support all around.

A pressure gauge 16 and valve 17 are provided for indicating the fluid pressure and adding the fluid. The electrical connections to the condenser are made on casing 1 and to auxiliary casing 5. To ensure good electrical contact between rotor 3 and terminal 5, a spring washer 18 is provided. For reducing the cost of manufacture, the upper end of casing 1 is threaded and fitted into collar 19, which is soft soldered to ensure it being fluid-tight. The faces of insulator 2 at all points which fit with metal parts are ground parallel, circular, concentric and true to each other to ensure against leakage and to ensure perfect alignment of the rotor with the stator. All pressure surfaces are padded with suitable material to equalize the strains on insulator 2. Insulator 2 is held in place by an internal cylinder 21 and a plurality of set screws 24 which are threaded into ring 23. Ring 23 is set into a circular recess 1a, and to make assembly possible, ring 23 is cut into three segments, which segments are secured in place by being pressed outward by the insertion of a taper screw 24a between two adjacent ends. The rotor plates are held in place on shaft 6 by means of a nut 27 and the stator plates are held in place within casing 1 by means of spacing ring 28 which is soldered in place to casing 1. A gasket 29 is located in the lower end of casing 1 to prevent the leakage of the fluid under pressure. A disc 25 encloses the lower portion of casing 1 and is secured in place by means of set screws 26 in the lower collar 20, which collar is threaded to casing 1 by means of threads 20a. The lower ball bearing 32 has a sliding fit over shaft 6 and does not resist end motion of the shaft. The upper ball bearing 33 is held firmly in place to 6 by a collar 6a, through intermediate sleeves 6c and 10, by means of a threaded ring or nut 30.

In the operation of this device, casing 1 is connected to one side of the circuit, and auxiliary casing 5 is connected to the opposite side. If it is desired to adjust the capacity value of the condenser when the unit is in place, then the upper end of 5 must be left accessible so that the adjusting tool which is not shown on the drawing can be inserted in the apertures 12b of disc 12, in order to rotate the same.

Any suitable fluid, such as compressed air, nitrogen or the like, is introduced into the unit through a valve 17 to a pressure of between one hundred and fifty to two hundred pounds, as is indicated on gauge 16. Should there be any connection leakage, this will be indicated by a drop in the pressure on the gauge and additional fluid may be introduced as is required.

For a general summary of this invention, it will be noted that insulator 2 is under compression, which is a more suitable arrangement than if it were under tension, as many forms of condensers in the prior art are constructed. The pressure side of the unit tends to tighten the seal between members 2 and 19, which results in a further assurance against leakage. All gasket joints are closed by means of relatively small set screws, such as 24 and 26, and thus further assures against leakage.

It is also to be noted that high frequency electrical currents tend to flow along the outer surface of the rotor and its connections so sliding contacts are provided when necessary to give a low resistance path along this surface. The rotor lead has a large diameter and therefore a small inductance which is generally advisable in this connection. This large diameter also increases the voltage rating of the condenser as determined by the possible breakdown between members 5 and 19.

Although only one modification of this invention is shown, it will be seen by anyone skilled in the art that it may be capable of taking other forms. Also, the number of plates and the diameter can be proportioned as required to suit any particular range of capacity.

What is claimed is:

1. An electric condenser including a casing, a first metallic electrode mounted within said casing, a dielectric element forming a closure for said casing and making a tight sealing joint therewith, a shaft supported from said dielectric element and extending into said casing, and a second metallic electrode mounted on said shaft within said casing and spaced from said first electrode, said sealing joint between said casing and said dielectric element being so placed that an increase in super-atmospheric pressure within the casing tends to seal said joint more tightly.

2. An electric condenser capable of operating at an internal fluid pressure different from atmospheric pressure, said condenser including an approximately cylindrical casing, means near one end of said casing forming an inwardly extending annular shoulder faced toward the higher pressure and held against movement axially of said casing in a direction toward the lower pressure, a dielectric closure member extending across said casing near said end and seated substantially against the side of said shoulder which is toward the higher pressure, so that an increase in the fluid pressure difference within and without said casing will tend to seat said dielectric member more firmly against said shoulder, means closing the opposite end of said casing in a substantially fluid tight manner, a first metallic electrode mounted within said casing, and a second metallic electrode spaced from the first electrode and supported from said dielectric member.

3. A condenser as described in claim 2, in which said dielectric member includes a tubular portion extending substantially in a direction axially of said casing and formed integral with the portion of said dielectric member which is seated against said shoulder, and in which said second metallic electrode is mounted upon a shaft extending through said tubular portion.

4. A sealed electric condenser for operation at an internal pressure different from surrounding atmospheric pressure, said condenser including a casing having near one end an inwardly projecting seat faced in the direction of the region of higher pressure, a sealing gasket on said seat, closure means extending across and closing said end of said casing, said closure means being seated against said gasket in such manner that the difference in pressure within and outside of said casing tends to hold said closure means firmly against said gasket, at least a portion of said closure means being of dielectric material, an elongated conducting member extending through said dielectric material and supported therefrom at two points widely spaced axially from each other, and two metallic electrodes within said casing, one of said electrodes being supported from and electrically connected to said conducting member.

5. A sealed electric condenser for operation at an internal pressure higher than surrounding atmospheric pressure, said condenser including a casing having near one end a seat faced inwardly toward the opposite end of the casing, a sealing gasket on said seat, closure means extending across and closing said end of said casing, said closure means being seated against said gasket in sealed relation thereto so that the internal pressure within said casing tends to press said closure means outwardly to keep it firmly seated against said gasket, at least a portion of said closure means being of dielectric material, a conducting member extending throgh said dielectric material, and two metallic electrodes within said casing, one of said electrodes being electrically connected to said conducting member and the other electrode being electrically insulated therefrom.

6. An electric condenser of the compressed fluid type including a casing having two electrode surfaces located therein, a dielectric element forming a closure for said casing, and making a tight sealing joint therewith, a shaft supported from said dielectric element and extending within said casing, a third electrode surface interposed between said first mentioned electrode surfaces and supported by said shaft, said sealing joint between said casing and said dielectric element being so placed that an increase in super-atmospheric pressure within said casing tends to seal said joint more tightly.

7. An electric condenser including an approximately cylindrical and gas-tight metal shell intended to carry internal pressure different from external atmospheric pressure, and closed in a substantially gas-tight manner at one end, a seat associated with said shell in a gas-tight manner adjacent the opposite end, a closure member of dielectric material mounted on said shell to close said opposite end, said closure member including a flange having an approximately circular marginal seat portion seated against said seat on said shell in sealed relation thereto, said flange extending from said seat portion obliquely toward the central axis of the shell, said closure member including also a tubular portion integral with said oblique flange and extending from the central portion of said flange a substantial distance in an approximately axial direction, a first metallic electrode mounted within and electrically connected to said shell, a metallic supporting member extending through said tubular portion of said dielectric member in gas-tight sealed relation thereto and projecting into the interior of said shell, and a second electrode mounted on said supporting member in spaced relation to said first electrode and cooperating therewith to produce electric capacitance when said shell is at a different electric potential from said metallic supporting member.

8. A manual adjustable operating means passing through a fluid tight wall comprising a housing member, an internal rotating spur gear connected to a rotatable operating shaft, a second spur gear eccentrically arranged to be in constant mesh with said internal rotating spur gear, a second shaft secured to said second gear, means within said housing member for cooperating with said second shaft and said second spur gear to keep it in constant mesh which is eccentric with respect to the center of said first spur gear, and means located at the end of said housing member for manually moving said second shaft to rotate said operating shaft.

9. A manual adjustable operating means passing through a fluid tight wall comprising a tubular housing member, an internal rotating spur gear connected to a rotatable operating shaft, a second spur gear eccentrically arranged to be in constant mesh with said internal rotating spur gear, a second shaft secured to said second gear, means within said tubular housing member for cooperating with said second shaft and said second spur gear to keep it in constant mesh which is eccentric with respect to the center of said first spur gear, means located at the end of said tubular housing member for manually moving said second shaft to rotate said operating shaft, and a flexible bellows interposed between said tubular housing member and said second shaft to prevent fluid leakage through the fluid tight wall to the outside atmosphere.

10. An adjustable condenser comprising a casing member having threaded ends, flanges located at each end of said casing and secured to the threaded ends of said casing member, a plurality of fixed and rotatable plate elements located within said casing, said casing being maintained at a pressure which is different from that of normal atmospheric pressure, a depending insulating member secured to the under-side of one of said flanges, a shaft for said rotatable plates passing through said insulator, tension means within said casing for forcing said insulator in a seal tight engagement with said casing, a plate for closing the end of said casing which is located opposite said insulator, and means external of said casing for applying pressure to said plate to close said casing and seal it from normal atmospheric pressure.

11. A manual adjustable operating means passing through a fluid tight wall comprising a housing member, an internal rotating spur gear connected to a rotatable operating shaft, a second spur gear eccentrically arranged to be in constant mesh with said internal rotating spur gear, a second shaft secured to said second gear, means within said housing member for cooperating with said second shaft and said second spur gear to keep it in constant mesh which is eccentric with respect to the center of said first spur gear, and means including a third spur gear secured to said second shaft at the opposite end from said second gear, and a fourth internal spur gear located at the end of said housing member and arranged to be meshed with said third gear for manually moving said operating shaft.

12. A manual adjustable operating means passing through a fluid tight wall comprising a housing member, an internal rotating spur gear connected to a rotatable operating shaft, a second spur gear eccentrically arranged to be in constant mesh with said internal rotating spur gear, a second shaft secured to said second gear, means within said housing member for cooperating with said second shaft and said second spur gear to keep it in constant mesh which is eccentric with respect to the center of said first spur gear, means including a third spur gear secured to said second shaft at the opposite end from said second gear, a fourth internal spur gear located at the end of said housing member and arranged to be meshed with said third gear for manually moving said operating shaft, and an indicating device for showing the position of said rotatable operating shaft located at said fourth gear.

JAMES L. FINCH.